United States Patent
Malin

(10) Patent No.: US 6,581,251 B2
(45) Date of Patent: Jun. 24, 2003

(54) DROP WIRE CLAMP

(75) Inventor: Glen K. Malin, New York, NY (US)

(73) Assignee: Allied Bolt, Inc., Hollis, NY (US)

( * ) Notice: Subject to any disclaimer, the term of this patent is extended or adjusted under 35 U.S.C. 154(b) by 0 days.

(21) Appl. No.: 10/005,574

(22) Filed: Oct. 26, 2001

(65) Prior Publication Data

US 2003/0079315 A1 May 1, 2003

(51) Int. Cl.$^7$ .............................. F16L 3/00; F16G 11/04
(52) U.S. Cl. .................... 24/136 R; 24/115 M; 24/130; 24/136 L; 403/371; 403/16; 403/109; 174/79; 248/63
(58) Field of Search ........................... 24/136 R, 136 L, 24/115 M, 130; 403/16, 109, 112, 371; 174/79; 248/63

(56) References Cited

U.S. PATENT DOCUMENTS

| | | | |
|---|---|---|---|
| 1,791,283 A | * 2/1931 | Pleister et al. ................. | 174/79 |
| 2,220,203 A | * 11/1940 | Branin ..................... | 24/136 R |
| 4,407,471 A | * 10/1983 | Wilmsmann et al. ......... | 248/63 |
| 4,542,562 A | 9/1985 | Okura | |
| 4,637,098 A | * 1/1987 | Okura et al. ............... | 24/136 R |
| 4,939,821 A | * 7/1990 | Frank, Jr. .................. | 24/136 R |
| 5,050,273 A | * 9/1991 | Okura ....................... | 24/136 R |
| 5,142,745 A | * 9/1992 | Setty et al. ................ | 24/136 R |
| 5,322,132 A | * 6/1994 | Frank, Jr. .................. | 24/136 R |
| 6,018,916 A | * 2/2000 | Henry ........................ | 52/126.1 |

OTHER PUBLICATIONS

Diamond Communications, Inc./Sachs Communications, Inc./South River, Inc. 1996 Catalog p. 115.

* cited by examiner

Primary Examiner—Victor Sakran
(74) Attorney, Agent, or Firm—Wolf, Greenfield and Sacks, P.C.

(57) ABSTRACT

A drop wire clamp comprising a shell, a wedge, and a shim, for securing a cable to a fixed object. The shell is an elongated open ended member that is tapered in length and is formed with a U shaped cross section, sized to receive the wedge in sliding engagement. The wedge has a shim fixed to its lower side with a surface shaped to frictionally engage the upper surface of a cable positioned within the shell and press it against a friction surface forming the bottom of the shell. A bail engages the wedge and shim to pull the wedge into operative engagement with the shell and a segment of cable extending through the shell.

8 Claims, 3 Drawing Sheets

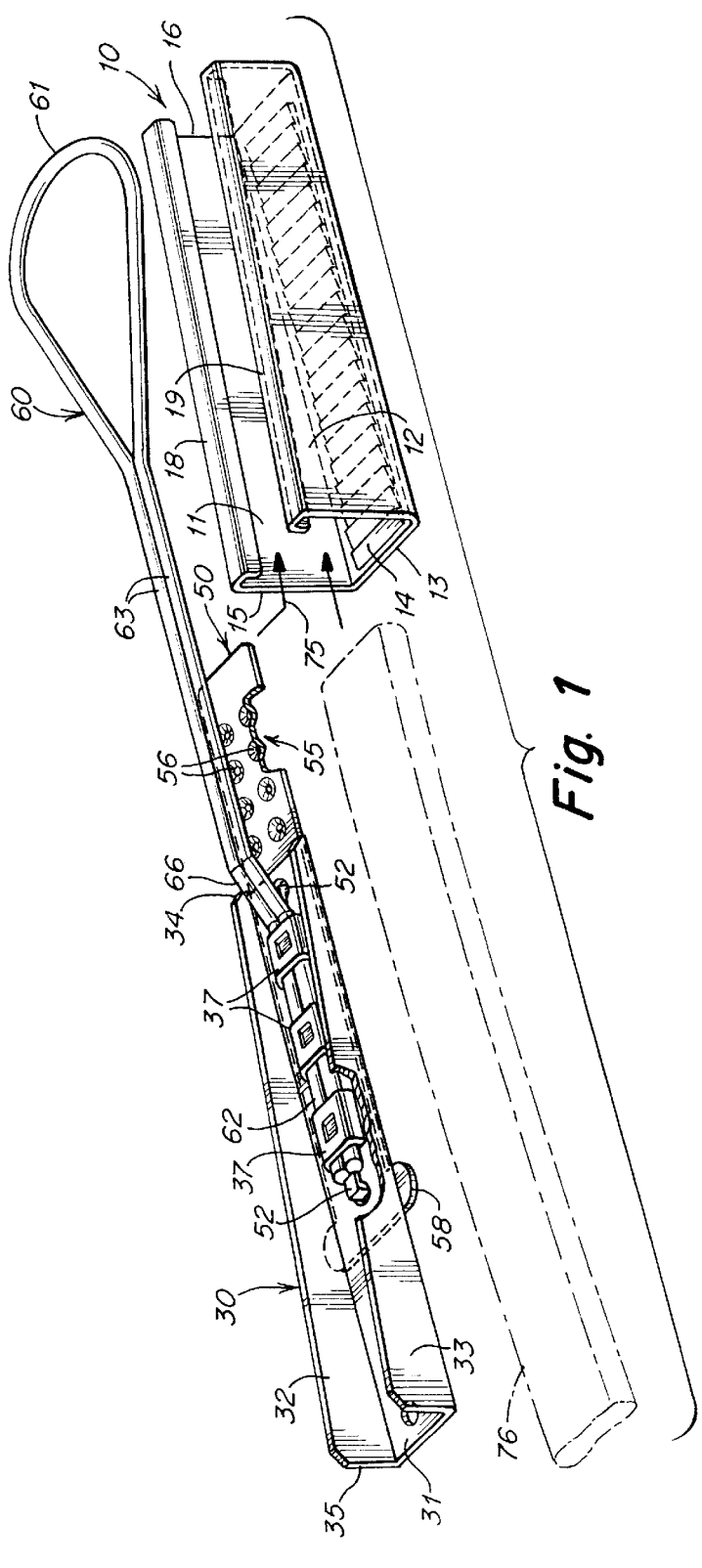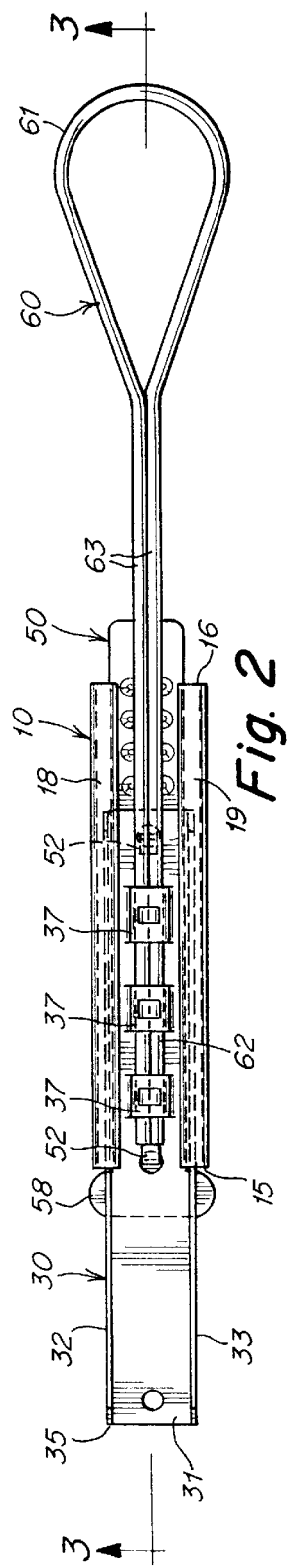

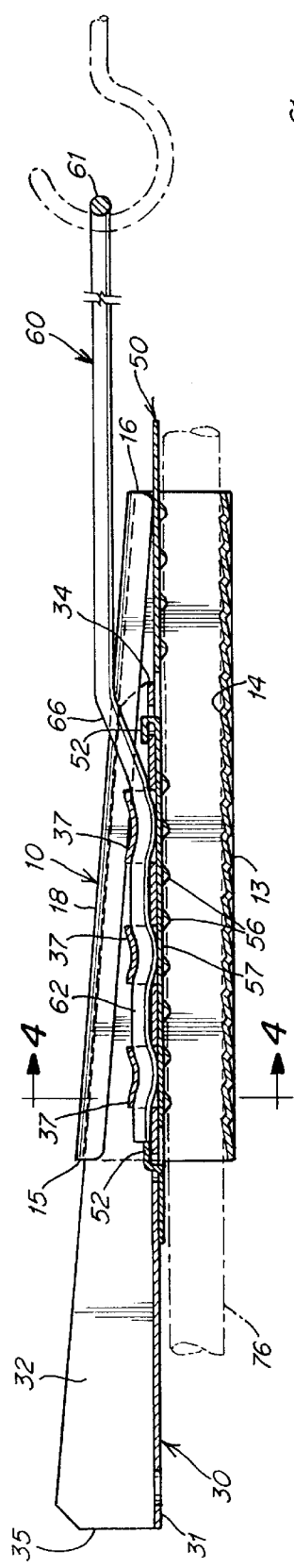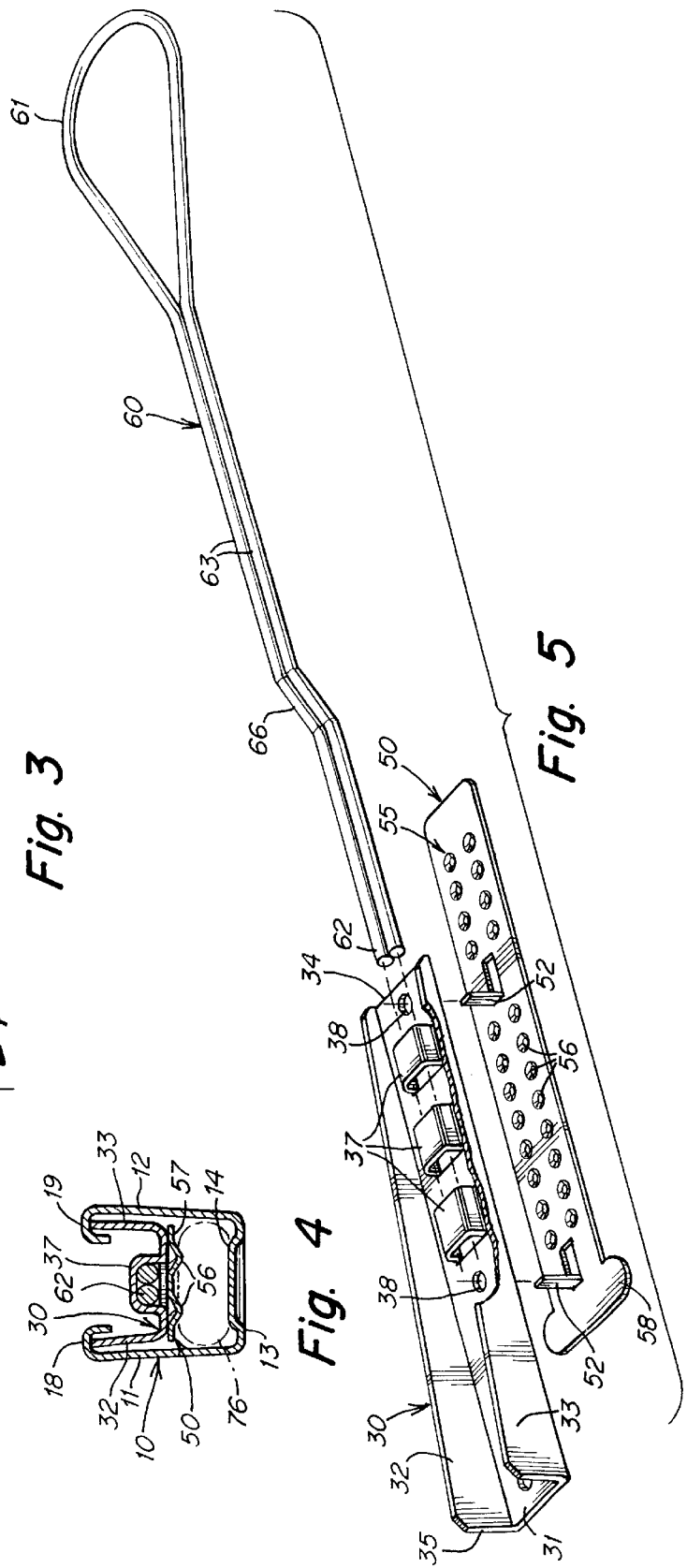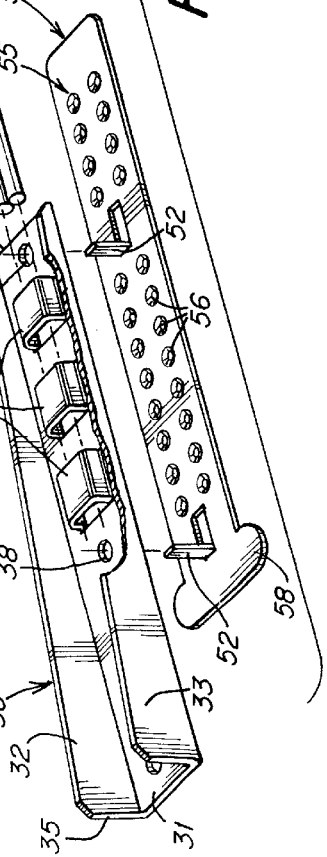

DROP WIRE CLAMP

SUBJECT MATTER OF THE INVENTION

This invention relates to an improvement in drop wire clamps which are used to secure cables and, particularly, to secure an intermediate section of an electrical wire cables to a supporting structure.

BACKGROUND OF INVENTION

Drop wire clamps are commonly used to securing electrical cables and the like. For example, these clamps are used to secure cable intermediate at its ends to a fixed structure with a portion of the cable extending beyond the drop wire clamp and into the structure. Such clamps are commonly used to secure a variety of cable lines on the outside of buildings, at a point just short of the position in which these cables enter the building.

Heretofore, various drop wire clamps have been developed which commonly provide clamping means intended to secure a cable. Those drop wire clamps which have heretofore been developed may have one or another of several deficiencies. For example, many such clamps are secured in a manner which damages the cable insulation, and are difficult to secure to a particular cable. Additionally, many clamping systems loosen over a time period.

SUMMARY OF INVENTION

The present invention is intended to provide a drop wire clamp of simple construction that is easy to use and is not likely to slip or permit inadvertent disengagement of the cable. These features are achieved by providing a drop wire clamp providing three components, including a shell, a wedge, and a shim that function in concert to secure the cable to a fixed object. In a preferred embodiment, the shell is formed as an elongated open-ended member, with one end having a smaller opening than the other, and with the length of the shell shaped to receive an intermediate section of the cable. The wedge is an elongated member with one end smaller than the other and is shaped and sized to permit its smaller end to slide into the other end of the shell and wedge a segment of the cable within the shell. A shim extends length-wise of, and is at least in part facing the wedge, with means for securing the wedge and shim together. Means are provided for engaging and pulling the wedge and shim into a locking engagement with a cable positioned in the shell. This means is preferably a conventional tail wire or bail secured to the wedge and shim.

Another aspect of this invention is to provide a drop wire clamp including a shell, a wedge and a shim in which the shim and wedge are secured together, thus facilitating insertion of the wedge-shim combination and the securing of the cable.

A further object of the present invention provides a drop wire clamp in which the securing of a cable requires less effort and handling of individual components.

The foregoing objects and advantages of the present invention will be more clearly understood when considered in conjunction with the accompanying drawings.

BRIEF DESCRIPTION OF DRAWINGS

FIG. 1 is an exploded perspective view of a drop-wire clamp assembly and cable embodying the present invention;

FIG. 2 is a top-plan view of the clamp assembly shown in FIG. 1;

FIG. 3 is a cross-sectional side view taken along the line 3—3 of FIG. 2 of the clamp engaged with a cable;

FIG. 4 is a cross-sectional end view taken along the line 4—4 of FIG. 3;

FIG. 5 is an exploded perspective view of the wedge, shim, and tail wire assembly.

DESCRIPTION OF THE PREFERRED EMBODIMENT

Figure 6:
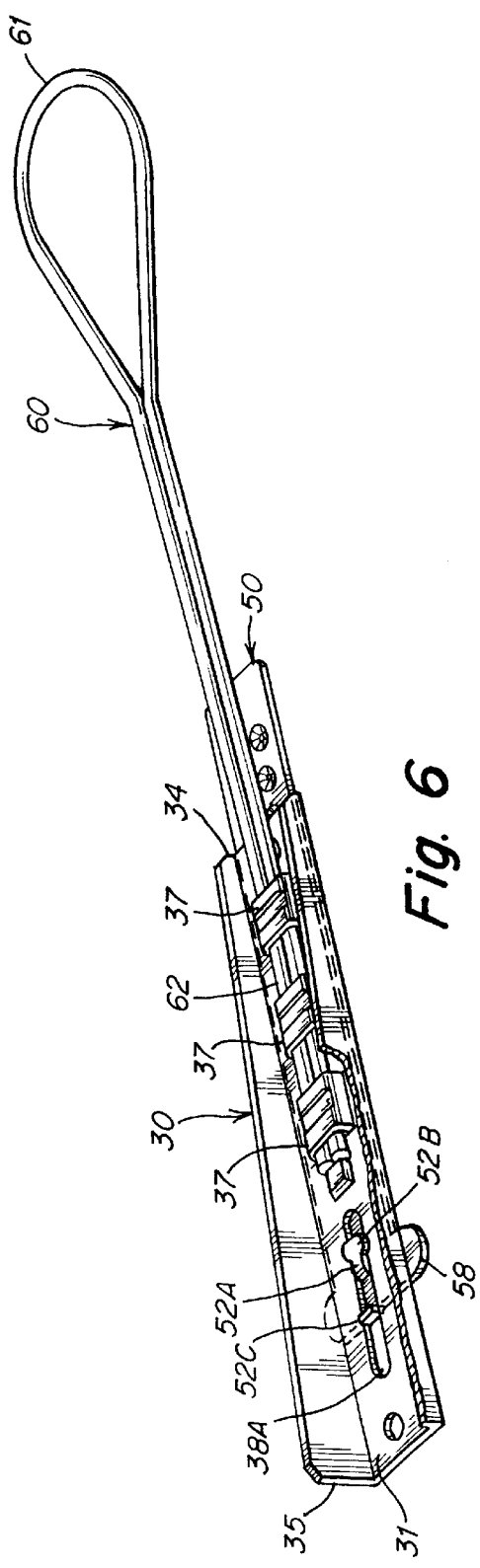
FIG. 6 is a perspective view, partially fragmented, of another embodiment of a drop wire clamp assembly and cable embodying the present invention.

The drop wire clamp of this invention includes a shell 10, a wedge 30, and shim 50, together with means 60 for engaging the wedge. In this preferred embodiment, the means 60 preferably comprises a bail forming an elongated wire looped at one end 61 with its other end 62 offset and secured to the wedge 30. The overall relation of these components is best illustrated in FIG. 1. As illustrated, the wedge 30 and shim 50 are shaped and sized to be slid into the shell 10 as illustrated by arrow 75 to engage a cable (shown in dotted outline) 76 that extends through the shell 10.

The shell 10 is formed as an elongated, open-ended member, having side walls 11 and 12 interconnected by a base or bottom 13 essentially defining a U-shaped cross section. The bottom 13 may be formed with an stepped or grooved surface 14 extending the length of the bottom 13. This stepped or grooved section forms a series of transverse teeth that are shaped to engage the cable surface. This friction surface may have a variety of configuration intended to provide a frictional engagement with the cable when it is positioned against the bottom 12. The walls 11 and 12 are tapered from a wide end 15 to a narrow end 16. The upper edges of the walls 11 and 12 are bent toward one another to form a pair of rails 18 and 19 with downwardly open channels along the upper edge of the walls 11 and 12. These rails are parallel to one another and are formed, shaped and sized to receive corresponding walls 32 and 33, of the wedge 30, hereafter described.

The wedge 30 is formed with an elongated base or bottom 31 with opposite upwardly extending side walls 32 and 33 at its longitudinally edges that taper from one end 34 to a wider other end 35. The side walls 32 and 33 are spaced apart and shaped to slide in the channels formed by the rails 18 and 19, respectively. The elongated base 31 is provided with a series of spaced offset tabs or crimps 37 that are longitudinally aligned with one another and are shaped and sized to receive the free ends of the wire forming the engaging bail 60 with these free ends 63 extending through the crimp members 37 and secured by these crimp members to the elongated base 31 in fixed and permanent relation. If desired, the engaging bail 60 may be formed with an offset section 66 for ease in pulling the wedge 30 into the shell 10. The wedge 30 has a maximum height at its other end 35 which is less than the height between the bottom 13 of the shell and the rails 18 and 19, thus providing a space that tapers from a wider other end 15 to the narrower one end 16 so that as the wedge 30 is pulled forwardly in the shell 10 it is moved downwardly towards the bottom 13 as the upper edges of the walls 32 and 33 move along the rails 18 and 19.

The shim 50 extends longitudinally of the wedge 30 and is preferably approximately the same width and at least partially overlapping (FIG. 5). In the illustrated embodiment, the forward portion of the shim 50 extends forwardly beyond the one end 34 of the wedge a distance of about a third of the length of the shim. The rear portion of the shim is formed with a laterally extending tab 58 having a width greater than the width of the shell 10 with this tab 58 sized to engage the sidewalls 11 and 12 at the wide end 15 to limit inward movement of the wedge 30 and shim 50 into the shell 10. The shim 50 is also provided with two upstanding tabs 52 that extend through the aligned openings 38 in the base 31. The upstanding tabs 52 extend through the holes and are crimped over to permanently secure the shim 50 against the lower surface of the elongated base 31 of the wedge. The shim 50 is also provided with means illustrated at 55 for frictionally engaging a length of the cable positioned between it and the bottom 13 of the shell. This frictional engaging means 55 may comprise, as illustrated, a series of punchholes in which the walls of the holes 56 project downwardly to form projecting and engaging elements in the lower surface 57 of the shim 50.

The shell 10, the wedge 30, and the shim 50 may be formed of stamped metal with the bail 60 for engaging these components, formed from an elongated wire that is permanently secured to the shim and wedge by the crimps 37.

In use, a section of cable is positioned in the shell 10 with the end extending beyond the shell sufficiently long to be connected as intended to equipment, for example within a building. The combination wedge 30 and shim 50 is pulled by the bail 60 over the cable and into the wider end of the shell 10. The wedge/shim combination is moved toward the smaller end of the shell, until it is stopped by engagement of tabs 50 with shell 10. In the position the undersurface of the shim frictionally engages the upper surface of the cable pressing the cable against friction surface 14.

A still further object of the present invention is to provide an improved means for securing a cable in which the cable is secured with a compression force without abrasively rubbing the securing mechanism against the cable. A modification illustrated in FIGS. 6 and 7 have some added advantages over the embodiment shown in FIGS. 1–5, and therefore, the embodiment of FIGS. 6 and 7 may also be considered a preferred embodiment. In this arrangement, like numbers in the drawing refer to corresponding features in the embodiments of FIGS. 1 through 5. These include the shell 10, the wedge 30, and the shim 50. The embodiment also includes a means 60 comprising the bail formed of an elongated wire looped at one end 61. However, in this embodiment the other end 62, although secured to the wedge 30 in a fashion similar to the embodiments of FIGS. 1 through 5, does not have an offset section. The various components recited function in a fashion similar to the embodiments of FIGS. 1 through 5 for purposes of engaging a cable 76 that extends through the shell 10. The end 62 is secured by crimps 37 in a manner similar to the embodiments of FIGS. 1 through 5. However, in this embodiment the crimps 37 may have a slightly different configuration than the crimps previously illustrated, although their function is substantially the same.

Figure 7:
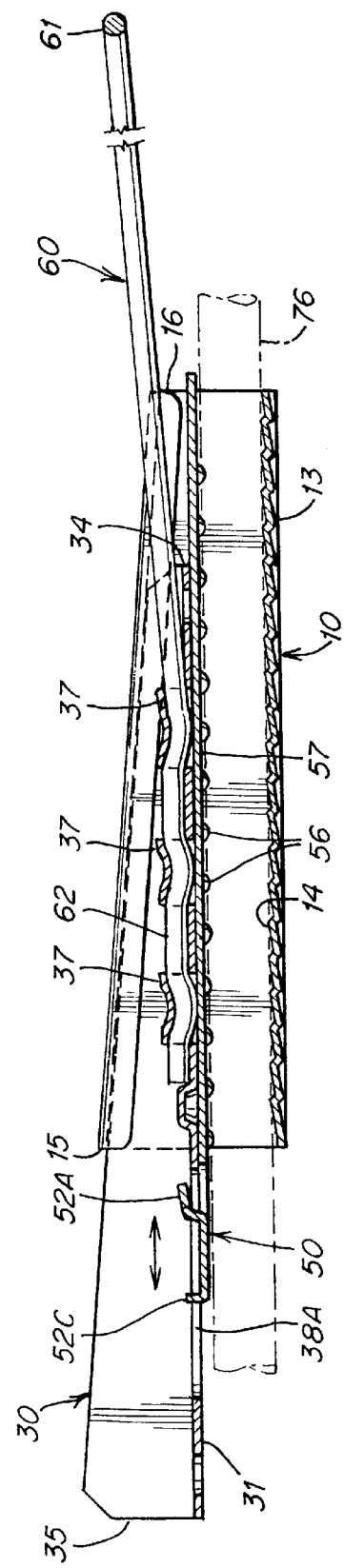
FIG. 7 is a cross-sectional view taken along a medial line lengthwise of the embodiment of FIG. 6.

The wedge 30 and shim 50 in the embodiments of FIGS. 6 and 7 are inter-engaged with one another in a manner that is varied from the embodiment of FIGS. 1 through 5. In the embodiments of FIGS. 1 through 5 the wedge 30 and shim 50 are secured in fixed relation to one another. This is achieved by the inter-engagement of the upstanding tabs 52, which extend through the aligned openings 38 in base 31. In that embodiment the openings 38 are small and secure the tabs 52 in fixed relation. In the embodiments of FIGS. 6 and 7, however, a single upstanding tab 52A extends through an elongated slot 38A in the base 31. The slot 38A extends lengthwise of the base 31 for a distance in the order of a quarter to a tenth of the length of the base. The tab 52A projects through the slot 38A and is formed with a pair of outwardly flared wings 52B, which extend beyond the side edges of the slot 38A to permanently secure the wedge 30 and shim 50 together in a sliding relationship. To provide additional stability the end of the shim 50 is also formed with an integrally extending upstanding tab 52C that also extends through the slot 38A in spaced relation to the tab 52A. This arrangement of the tabs 52A and 52C in space longitudinal alignment assure that the shim 50 will slide parallel to the wedge 30 on movement.

The embodiments of FIGS. 6 and 7 function in substantially the same fashion as do the embodiment of FIGS. 1 through 5. However, the added sliding relation of the wedge and shim, one to the other, additionally assist in minimizing the likelihood of inadvertently abrading the cable 76, which is secured under compressive pressure when the wedge and shim are slid into a locking or frictional engagement with the shell 10 and cable 76.

What is claimed is:

1. A drop wire clamp having a shell, a wedge, and a shim for securing a able to a fixed object, said shell formed as an elongated open ended member with one end having a smaller opening than the other and with the length of the shell shaped to receive an intermediate section of a cable, said wedge formed as an elongated member with one end smaller than the other and further shaped and sized to slide into the other end of the shell with the smaller end of the wedge first, and with a length of cable lying within the shell, said shim extending lengthwise of and at least in part facing said wedge with means fixing said wedge and shim together, and means for engaging and pulling said wedge and shim into a locking engagement with said shell and the cable positioned therein, wherein said fixing means comprises at least one engaging tab extending from one of said wedge and shim to the other of said wedge and shim.

2. A drop wire clamp as set forth in claim 1 wherein said wedge has an elongated base shaped to slide longitudinally into said shell and a pair of rails tapered from a larger to smaller width at the one end of said wedge.

3. A drop wire clamp as set forth in claim 2, wherein said shim has a friction engaging surface for engaging a cable in said shell.

4. A drop wire clamp as set forth in claim 2 wherein said shell has a base and parallel sidewalls extending therefrom, said sidewalls tapered from wide to narrow toward said one end, and a pair of channels shaped to slidingly receive said rails.

5. A drop wire clamp as set forth in claim 4 wherein said shell has an irregular surface for frictionally engaging a cable.

6. A drop wire clamp as set forth in claim 1 wherein said means for engaging and pulling comprises a bail having a pair of legs, the ends of which are constructed to be secured to said wedge.

7. A drop wire clamp as set forth in claim 6 having at least one clamp formed in said wedge base for engaging the legs of said bail.

8. A drop wire clamp as set forth in claim 1 wherein said at least one upstanding tab includes a pair of upstanding tabs constructed to extend from the shim and through a pair of openings in the wedge to engage the base of said wedge.

* * * * *